(12) United States Patent
Kang

(10) Patent No.: US 9,036,725 B1
(45) Date of Patent: May 19, 2015

(54) METHOD FOR ADJUSTING FFT WINDOW OF OFDM SYSTEM

(71) Applicant: FCI Inc., Sungnam, Gyeonggi-Do (KR)

(72) Inventor: Byung Su Kang, Sungnam (KR)

(73) Assignee: FCI Inc., Sungnam, Gyeonggi-Do (KR)

( * ) Notice: Subject to any disclaimer, the term of this patent is extended or adjusted under 35 U.S.C. 154(b) by 0 days.

(21) Appl. No.: 14/202,229

(22) Filed: Mar. 10, 2014

(51) Int. Cl.
*H04L 27/28* (2006.01)
*H04L 27/26* (2006.01)
*H04J 11/00* (2006.01)

(52) U.S. Cl.
CPC ........ *H04L 27/2666* (2013.01); *H04L 27/2665* (2013.01); *H04J 11/0023* (2013.01)

(58) Field of Classification Search
CPC .......................... H04L 27/2605; H04L 27/2607
USPC .......................................................... 375/260
See application file for complete search history.

(56) References Cited

U.S. PATENT DOCUMENTS

| 2003/0090419 A1* | 5/2003 | Tanaka et al. ................. 342/378 |
| 2008/0002645 A1* | 1/2008 | Seki et al. ..................... 370/338 |

* cited by examiner

*Primary Examiner* — Kevin Kim
(74) *Attorney, Agent, or Firm* — Lowe Hauptman & Ham, LLP

(57) ABSTRACT

Disclosed is a method for adjusting FFT window of OFDM system. The method is categorized two scenarios when the maximum delay length of the channel is shorter than the guard interval length and when the maximum delay length of the channel is longer than the guard interval length. In respective scenarios, the method comprises steps: Step A, multiplying the guard interval (A1) damaged due to the path fading channel delay by a weighted value (α); Step B, multiplying the guard interval (A2) not damaged due to the path fading channel delay by a weighted value (1-α); and Step C, Adding the guard intervals of Step A and Step B together (A3) to be inputted into FFT; minimizing the inter-symbol interference, the inter-channel interference and the noise.

4 Claims, 4 Drawing Sheets

METHOD FOR ADJUSTING FFT WINDOW OF OFDM SYSTEM

FIELD OF THE INVENTION

The present invention relates to an orthogonal frequency division multiplexing (OFDM) system, and more particularly to an effective method for adjusting a fast fourier transform (FFT) window in the OFDM system by using guard intervals.

BACKGROUND OF THE INVENTION

Generally, in an orthogonal frequency division multiplexing (OFDM) systems, it is an effective method for adjusting a fast fourier transform (FFT) window with the use of protection intervals to use the channel impulse response (CIR) signal to noise ratio (SNR) information for adjusting the FFT window before transforming received data with the use of FFT, so as to minimize inter-symbol interference (ISI), inter-channel interference (ICI) and noise power, thereby improving the system performance.

However, in the conventional OFDM system, only the square FFT window or only portions thereof which is not damaged even using the guard interval is used. Thus, the longer a maximum delay length of the channel is, the more the limited gain is.

FIG. 1 is a schematic diagram showing a data modulating in a transmission portion of the conventional OFDM system, and FIG. 2 is a schematic diagram showing a process for adding the guard interval to the transmission portion of the conventional OFDM system. In order to avoid the inter-symbol interference and inter-channel interference resulted from the insertion of the guard interval, as shown in FIG. 2, a rear guard interval which is transformed by inverse fast fourier transform (IFFT) is reproduced and added into the front.

FIG. 3 is a schematic diagram showing an example. In this example, symbol is received from the channel with two paths, and the maximum delay length of the channel is shorter than the guard interval, and it is illustrated that signals pass through the channel when the maximum delay length of the channel is shorter than the guard interval. In order to illustrate, it is assumed that the channel has two paths.

As shown in FIG. 3, when transmitting the continuous OFDM symbol, the information of the previous symbol which delays due to the two paths is added to a portion A in the received symbol, and thus the portion A is the portion with inter-symbol interference. However, portions B and C have the same symbol information due to the guard interval. Therefore, if a starting position of FFT is arranged in the portions B to overlap the square FFT window, and then FFT is implemented, the inter-symbol interference and inter-channel interference can be prevented.

In addition to the use of preventing the inter-symbol interference and inter-channel interference, the guard interval can be used for determining the maximum delay length of the channel, so as to reduce noise. As shown in FIG. 3, the intervals A and B in the received symbol are the guard intervals, i.e. the rear portions of the reproduced symbol. Although the interval A is damaged due to the previous symbol, the interval B is completely undamaged. If the maximum delay length of the channel can be determined, the width of the interval B can be determined. Similar to the interval B which is the undamaged guard interval, the rear portion of the symbol has the same information as the original state. Therefore, if they are summed and then simply divided by 2, the signal in original state can be obtained, and the noise power can be halved, thereby improving the system performance.

In the way of using the undamaged guard interval, when the guard interval is elongated and the maximum delay length of the channel is shortened, the interval for reducing noise can be broadened, thereby improving the performance. However, when the maximum delay length of the channel is elongated, the performance gain is gradually reduced. In addition, when the maximum delay length of the channel is longer than the guard interval, the inter-symbol interference (ISI) and inter-channel interference (ICI) occur, resulting in a severe performance degradation.

SUMMARY OF THE INVENTION

A primary object of the present invention is to provide a method for adjusting a FFT window in the OFDM system, so as to reduce the performance degradation resulting from the inter-symbol interference and inter-channel interference when the maximum delay length of the channel is longer.

A secondary object of the present invention is to provide a method for adjusting a FFT window in the OFDM system by using the guard intervals and external information of the symbol to minimize the inter-symbol interference and inter-channel interference when the maximum delay length of the channel is longer.

To achieve the above-mentioned objects, the method of the present invention for adjusting the FFT window in the OFDM system comprises: Step A, multiplying a guard interval ($A_1$) damaged due to a path fading channel delay by a weighted value ($\alpha$) when a maximum delay length of a channel is shorter than a guard interval length; Step B, multiplying a undamaged guard interval ($A_2$) not damaged due to the path fading channel delay by a weighted value ($1-\alpha$); and Step C, adding the guard interval of Step A and the undamaged guard interval of Step B together to be inputted into FFT, so as to achieve a FFT input ($A_3$).

In addition, to achieve the above-mentioned objects, the method of the present invention for adjusting the FFT window in the OFDM system comprises: Step A, multiplying an interval ($A_1$) at a FFT starting position by a weighted value ($\alpha$) when a maximum delay length of the channel is longer than a guard interval length; Step B, multiplying an interval ($A_2$) at a FFT ending position by a weighted value ($1-\alpha$); and Step C, adding the multiplied interval of Step A and the multiplied interval of Step B together to be inputted into FFT, so as to achieve a FFT input ($A_3$).

With the use of method of the present invention for adjusting the FFT window in the OFDM system, the inter-symbol interference, inter-channel interference and noise of the damaged guard interval can be minimized.

Furthermore, the system performance can be improved when the maximum delay length of the channel is elongated, and the system performance can be ensured when the maximum delay length of the channel is longer than the guard interval length.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

In order to make the illustration of the present invention more explicit and complete, the following description is stated with reference to FIG. 4 through FIG. 8.

Figure 1:
FIG. 1 is a schematic diagram showing a data modulating in a transmission portion of the conventional OFDM system.
Figure 2:
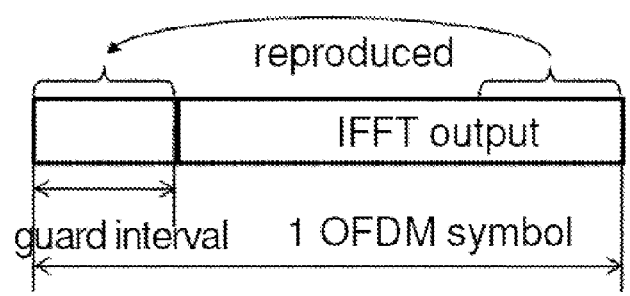
FIG. 2 is a schematic diagram showing a process for adding the guard interval to the transmission portion of the conventional OFDM system.
Figure 3:
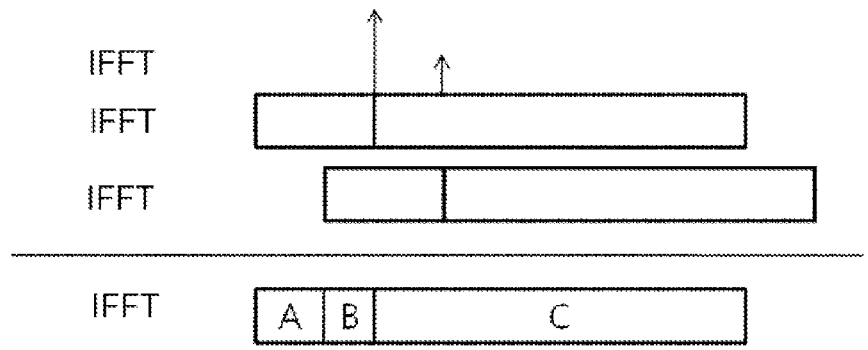
FIG. 3 is a schematic diagram showing a symbol received from the channel with two paths, wherein the maximum delay length of the channel is shorter than the guard interval.
Figure 4:
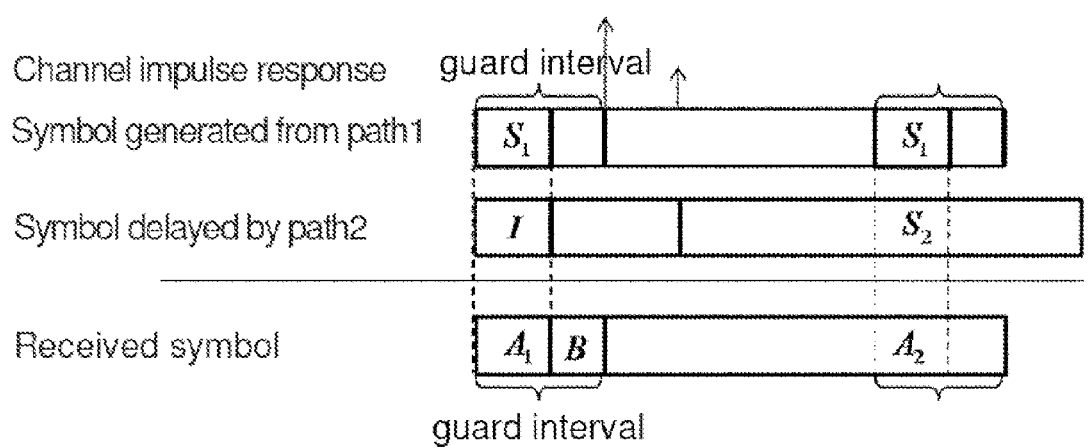
FIG. 4 is a schematic diagram showing damaged guard intervals which are received from a channel with a maximum delay length shorter than a guard interval length and two paths according to the present invention.

FIG. 4 is a schematic diagram showing damaged guard intervals which are received from a channel with a maximum delay length shorter than a guard interval length and two paths according to the present invention. The following manner is known and therefore not described: in conventional technologies, noise is removed by the undamaged parts of the guard interval in the received symbol.

Referring to FIG. 4, an interval $A_1$ of the received symbol is a guard interval damaged due to a path fading channel delay. As expressed in Equation 1, there is no inter-symbol interference between the damaged guard interval $A_1$ and an interval $A_2$.

[Eq. 1]:

$$A_1 = S_1 + I + N_1$$

$$A_2 = S_1 + S_2 + N_2 \quad \text{[Eq. 1]}$$

Herein, "I" indicates an interference component generated due to a previous symbol, and "N1" and "N2" indicate noises added to the interval A1 and the interval A2, respectively.

In the conventional technologies, the damaged guard interval $A_1$ due to the inter-symbol interference is not used. In the present invention, the damaged guard interval $A_1$ can be used, and the inter-symbol interference and inter-channel interference can be minimized by using the channel impulse response (CIR) signal to noise ratio (SNR), thereby reducing noise power as well as improving the system performance.

Figure 5:
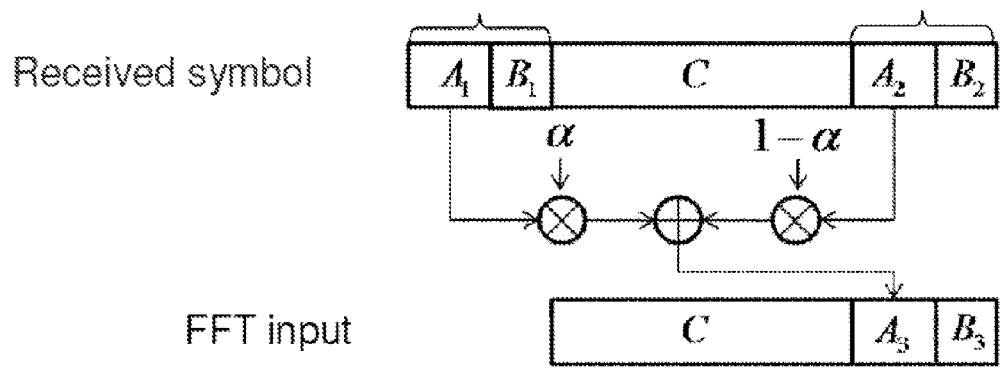
FIG. 5 is a schematic diagram showing the method according to present invention for using the damaged guard interval to minimize the inter-symbol interference, inter-channel interference and noise.

FIG. 5 is a schematic diagram showing the method according to present invention for using the damaged guard interval to minimize the inter-symbol interference, inter-channel interference and noise power, and the method for using the guard interval $A_1$ is illustrated in FIG. 5.

Referring to FIG. 5, the damaged guard interval $A_1$ and the undamaged guard interval $A_2$ are multiplied by a weighted value, and then they are added together to perform Fast Fourier Transform (FFT), and the FFT is inputted to an interval $A_3$. As shown in FIG. 5, Equation 2 can be expressed as follows:

$$A_3 = \alpha A_1 + (1-\alpha) A_2 \quad \text{[Eq. 2]}$$

Herein, for obtaining an optimum weighted value (i.e. $\alpha$), Equation 3 is expressed by substituting Equation 1 into Equation 2.

$$A_3 = \alpha A_1 + (1-\alpha) A_2 = \alpha(S_1 + I + N_1) + (1-\alpha)(S_1 + S_2 + N_2)$$
$$= \alpha S_1 + \alpha I + \alpha N_1 + S_1 + S_2 + N_2 - \alpha S_1 - \alpha S_2 - \alpha N_2 = S_1 +$$
$$S_2 - \alpha S_2 + \alpha I + \alpha N_1 + (1-\alpha) N_2 \quad \text{[Eq. 3]}$$

Herein, if $A_3 = S_1 + S_2$, the noise is equal to 0, and the inter-symbol interference and inter-channel interference are obviated. Therefore, it is required to calculate the other values in Equation 3, apart from $S_1 + S_2$, and the value of a which is close to 0, as expressed in Equation 4.

$$-\alpha S_2 + \alpha I + \alpha N_1 + (1-\alpha) N_2 \quad \text{[Eq. 4]}$$

Herein, the calculated value according to Equation 4 is an instantaneous value. Therefore, for determining the calculated value which is closest to 0, the average power is calculated to determine the $\alpha$ value closest to 0. All items in Equation 4 independent, and thus the average power can be simply shown in Equation 5.

$$\alpha^2 P_{S_2} + \alpha^2 P_I + \alpha^2 P_N + (1-\alpha)^2 P_N \quad \text{[Eq. 5]}$$

Herein, as shown in FIG. 4, $P_{S2}$ and $P_I$ are average powers of the symbol and interference which are formed by the second path of the channel, and $P_N$ is an average power of noises. The average powers of the OFDM symbol are equal ($P_{S2} = P_I$). Therefore, Equation 5 is expressed as a quadratic equation with $\alpha$, so as to obtain Equation 6.

$$\alpha^2 (P_{S_2} + P_I + 2P_N) - 2\alpha P_N + P_N = 0$$

$$\alpha^2 (2P_{S_2} + 2P_N) - 2\alpha P_N + P_N = 0 \quad \text{[Eq. 6]}$$

Herein, there is no real number solution of $\alpha$ existing in Equation 6. Therefore, the $\alpha$ value closest to 0 can be determined by differentiating the $\alpha$, as expressed in Equation 7. As shown in FIG. 5, this value is used to minimize the inter-symbol interference, inter-channel interference and noise.

$$2\alpha(2P_{S_2} + 2P_N) - 2P_N = 0 \quad \text{[Eq. 7]}$$

$$\alpha = \frac{P_N}{2P_{S_2} + 2P_N}$$

As above, it is explained that the maximum delay length of the channel is shorter than the guard interval length. Hereinafter, it is explained that the maximum delay length of the channel is longer than the guard interval length.

Figure 6:
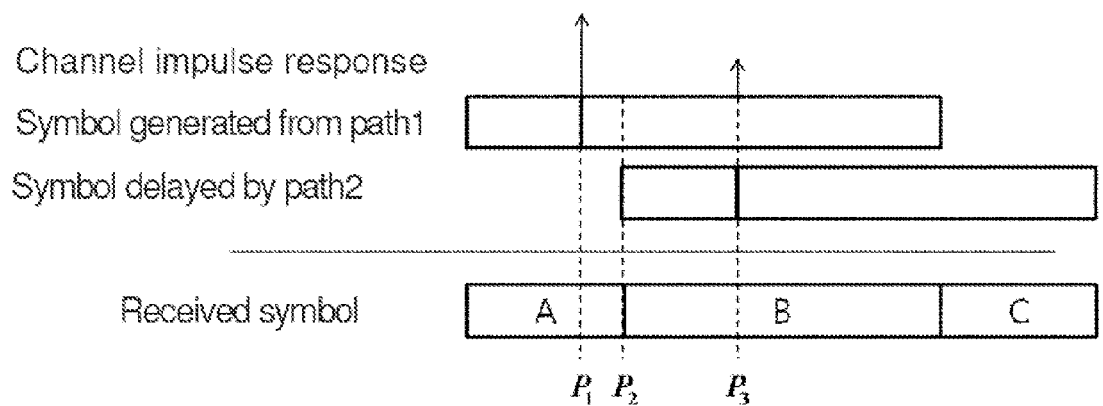
FIG. 6 is a schematic diagram showing a symbol which is received from a channel with a maximum delay length longer than a guard interval length and two paths according to the present invention.

FIG. 6 is a schematic diagram showing the symbol which is received from a channel with a maximum delay length longer than a guard interval length and two paths according to the present invention.

Referring to FIG. 6, in the received symbol, an interval A includes a present symbol generated from a first path and a previous symbol generated from a second path, and an interval B is an interval only includes the present symbol, and an interval C includes a symbol generated from the first path and the present symbol generated from the second path.

There is no inter-symbol interference in the interval B. However, a length of the interval B is shorter than a length for FFT, and it is difficult to determine a FFT starting position in the conventional OFDM system. That is because, in this case of a power of the path 1 being greater than a power of the path 2, the inter-symbol interference and inter-channel interference are minimized when $P_1$ is set as the FFT starting position. However, in this case of the power of the path 2 being greater, the inter-symbol interference and inter-channel interference are minimized when $P_2$ is set as the FFT starting position.

In the embodiment of FIG. 6, for simplification, only two paths are mentioned. However, if the number of paths is getting more, it is more complicated to find the optimum FFT starting position.

In the present invention, the FFT starting position is aligned with the first path of the all paths, so as to minimize the inter-symbol interference and inter-channel interference for adjusting the FFT input. For replacing the complicated calculation of finding the optimum FFT starting position, this method is explained as follows.

Figure 7:
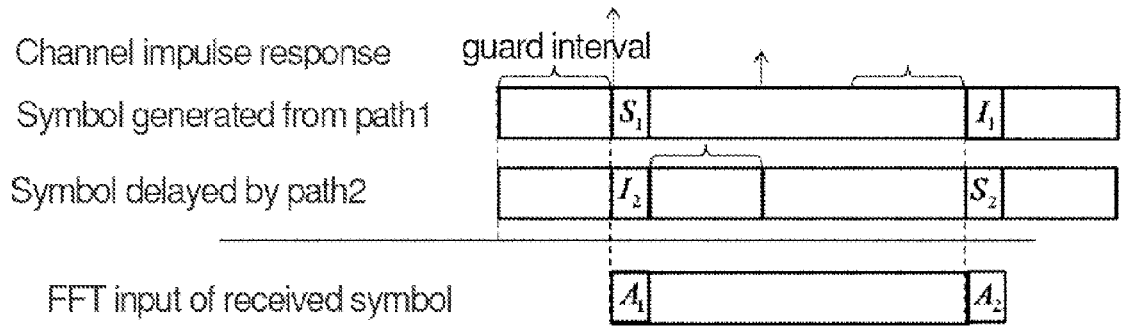
FIG. 7 is a schematic diagram showing a channel with a maximum delay length longer than a guard interval length and two paths according to the present invention, and the inter-symbol interference in the FFT input is illustrated when the FFT starting position is set in the first path.
Figure 8:
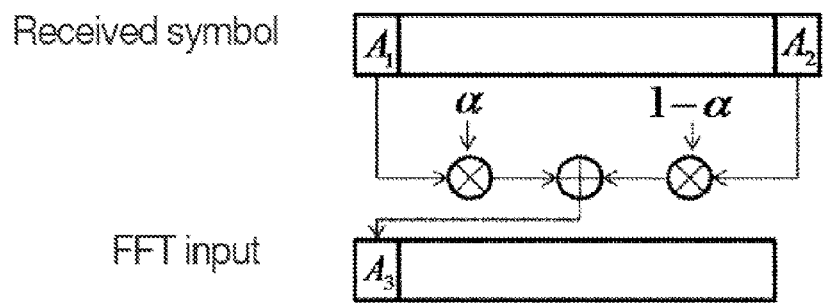
FIG. 8 is a schematic diagram showing a method for minimizing the inter-symbol interference, inter-channel interference and noise, wherein the channel has the maximum delay length longer than a guard interval length and two paths.

FIG. 7 is a schematic diagram showing a channel with a maximum delay length longer than a guard interval length and two paths according to the present invention. As shown in FIG. 7, the inter-symbol interference in the FFT input is illustrated when the FFT starting position is set in the first path. FIG. 8 is a schematic diagram showing a method for minimizing the inter-symbol interference, inter-channel interference and noise, wherein the channel has the maximum delay length longer than a guard interval length and two paths.

Referring to FIG. 7, only a front portion of the FFT input (the maximum delay length of the channel—the guard interval length) has the inter-symbol interference. The interval $A_1$ is equal to the front portion and can be expressed as $A_1$ in Equation 8. The interval $A_1$ is positioned at the FFT starting position, and the interval $A_1$ is positioned at a FFT ending position.

In addition, when adjusting the FFT input by removing the inter-symbol interference, inter-channel interference and noise, an optimum value ($A_{opt}$) is expressed as follows.

[Eq. 8]:

$$A_1 = S_1 + I_2 + N_1$$

$$A_{opt} = S_1 + S_2$$

In the FFT input shown in FIG. 8, in order to make the interval $A_3$ close to the optimum value $A_{opt}$ of signal components, the interval $A_2$ and interval $A_2$ are used, as shown in Equation 3, and it can be expressed as Equation 9.

$$A_3 = \alpha A_1 + (1-\alpha)A_2 = \alpha(S_1 + I_2 + N_1) + (1-\alpha)(I_1 + S_2 + N_2) = \alpha S_1 + \alpha I_2 + \alpha N_1 + I_1 + S_2 + N_3 - \alpha I_1 - \alpha S_2 - \alpha N_2 = S_1 + S_2 - (1-\alpha)S_1 + \alpha I_2 + \alpha N_1 + I_1 + N_2 - \alpha S_2 - \alpha I_1 - \alpha N_2 = S_1 + S_2 - (1-\alpha)S_1 + \alpha I_2 + \alpha N_1 + (1-\alpha)I_1 + (1-\alpha)N_2 - \alpha S_2 \quad [\text{Eq. 9}]$$

With the use of the same manner, in addition to the optimum value $A_{opt}$, an average power of the other items can be expressed as Equation 10.

$$(1-\alpha)^2 P_{S_1} + \alpha^2 P_{I_2} + \alpha^2 P_{N_1} + (1-\alpha)^2 P_{I_1} + (1-\alpha)^2 P_{N_2} + \alpha^2 P_{S_2} \quad [\text{Eq. 10}]$$

Herein, $P_{s1}$ and $P_{I1}$ are average powers of the symbol passing through the first path, and thus are equal. Similarly, $P_{s2}$ and $P_{I2}$ are average powers of the symbol passing through the second path, and thus are equal. Therefore, Equation 10 which is collated according to a can be expressed by Equation 11.

$$(1-\alpha)^2 P_{S_1} + \alpha^2 P_{S_2} + \alpha^2 P_N + (1-\alpha)^2 P_{S_1} + (1-\alpha)^2 P_N + \alpha^2 P_{S_2} = \alpha^2(2P_{S_1} + 2P_{S_2} + 2P_N) + \alpha(-4P_{S_1} - 2P_N) + 2P_{S_1} + P_N \quad [\text{Eq. 11}]$$

It is required to determine the a value closest to 0 in Equation 11. Therefore, there is no real number solution of a existing in Equation 11 when α is expressed as a quadratic equation. Accordingly, the a value closest to 0 can be determined by differentiating the a, as expressed in Equation 12.

$$2\alpha(2P_{S_1} + 2P_{S_2} + 2P_N) - 4P_{S_1} - 2P_N = 0 \quad [\text{Eq. 12}]$$

$$\alpha = \frac{2P_{S_1} + P_N}{2P_{S_1} + 2P_{S_2} + 2P_N}$$

As described above, with the use of the channel impulse response signal to noise ratio information, the inter-symbol interference, inter-channel interference and noise power can be minimized. Therefore, when the maximum delay length of the channel is longer than the guard interval length, the performance degradation can be minimized. In addition, the damaged guard interval can be used to further improve performance.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A method for adjusting a fast fourier transform (FFT) window in an orthogonal frequency division multiplexing (OFDM) system, comprising:

Step A, multiplying a guard interval damaged due to a path fading channel delay by a weighted value (α) when a maximum delay length of a channel is shorter than a guard interval length;

Step B, multiplying a undamaged guard interval not damaged due to the path fading channel delay by a weighted value (1-α); and Step C, adding the guard interval of Step A and the undamaged guard interval of Step B together to be inputted into FFT.

2. The method for adjusting the FFT window according to claim 1, wherein the weighted value (α) is determined by the following equation:

$$\alpha = \frac{P_N}{2P_{S_2} + 2P_N};$$

wherein, $P_{S2}$ is an average power of a symbol passing through a second path, and $P_N$ is an average power of noises.

3. A method for adjusting a FFT window in an OFDM system, comprising:

Step A, multiplying an interval at a FFT starting position by a weighted value (α) when a maximum delay length of the channel is longer than a guard interval length;

Step B, multiplying an interval at a FFT ending position by a weighted value (1-α); and Step C, adding the multiplied interval of Step A and the multiplied interval of Step B together to be inputted into FFT.

4. The method for adjusting the FFT window according to claim 3, wherein the weighted value (α) is determined by the following equation:

$$\alpha = \frac{2P_{S_1} + P_N}{2P_{S_1} + 2P_{S_2} + 2P_N};$$

wherein, $P_{S1}$ is an average power of a symbol passing through a first path, and $P_{S2}$ is an average power of a symbol passing through a second path, and $P_N$ is an average power of noises.

\* \* \* \* \*